June 24, 1930.  J. M. HOWE  1,767,212
AUTOMOBILE BUMPER
Filed Oct. 27, 1928
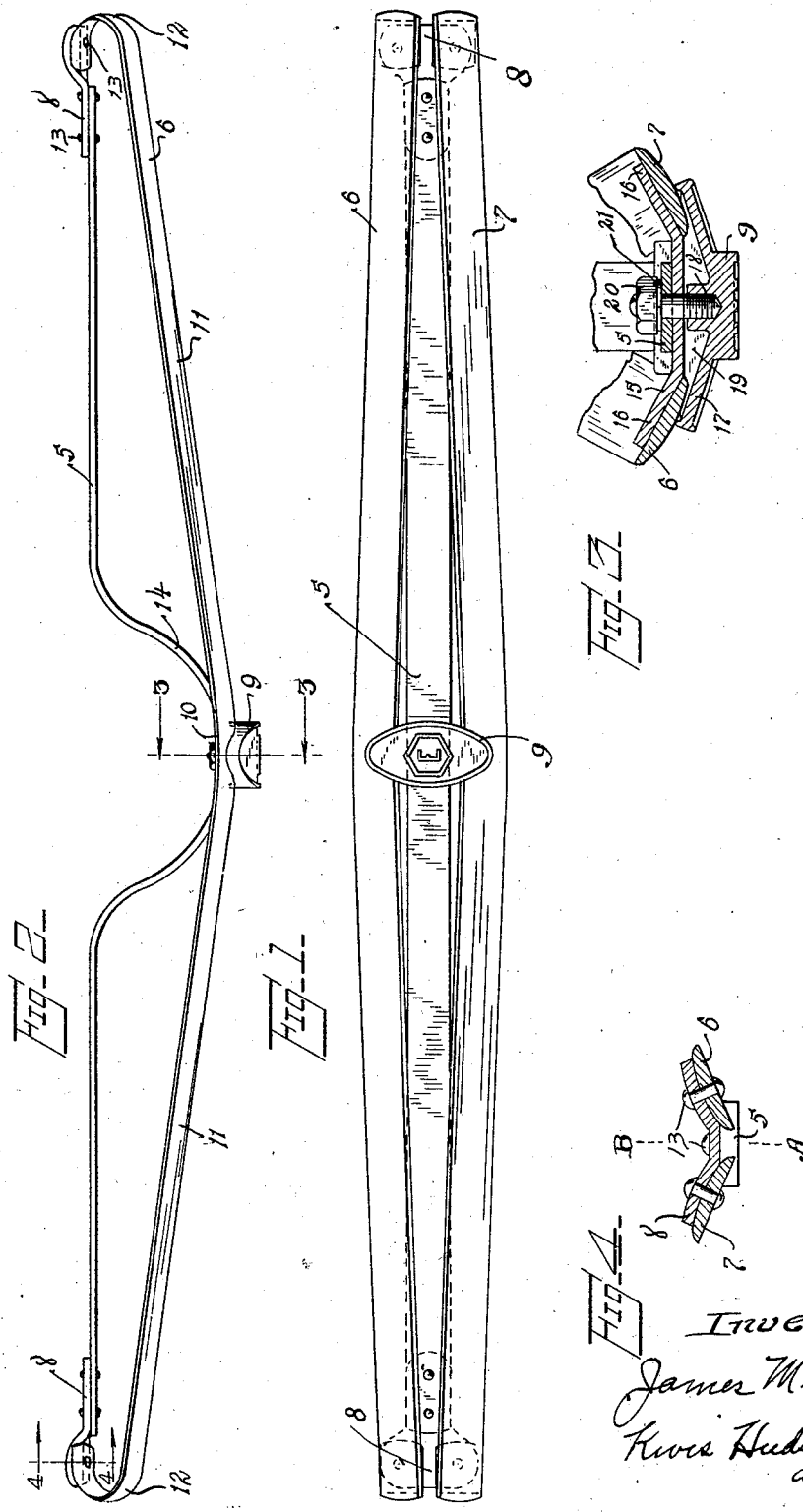

Patented June 24, 1930

1,767,212

UNITED STATES PATENT OFFICE

JAMES M. HOWE, OF CLEVELAND, OHIO, ASSIGNOR TO THE EATON AXLE & SPRING COMPANY, OF CLEVELAND, OHIO, A CORPORATION OF OHIO

AUTOMOBILE BUMPER

Application filed October 27, 1928. Serial No. 315,484.

This invention relates to automobile bumpers and more particularly to automobile bumpers of the flexible bar type.

An object of this invention is to provide a bumper having impact bars, which have been bent in one plane only, assembled so as to have the appearance of impact bars which have been bent in two planes.

Another object of this invention is to provide a bumper having bent impact bars, assembled in such position as to have the appearance of impact bars which have been bent edgewise.

Still another object of this invention is to provide for manufacture at low cost, a bumper which, in appearance, closely resembles a bumper employing impact bars bent in two planes.

A further object of this invention is to provide a bumper having impact bars, bent in one plane only, assembled in such position as to provide a wider impact surface centrally of the bumper than at its ends.

With the above and other objects in view the invention may be said to comprise the bumper illustrated in the accompanying drawings, hereinafter described, and particularly set forth in the appended claims, together with such variations and modifications thereof as will be apparent to one skilled in the art to which the invention appertains.

Reference should be had to the accompanying drawings forming a part of this specification in which:

Fig. 1 is a front elevational view of the bumper;

Fig. 2 is a top plan view thereof;

Fig. 3 is a sectional view taken on line 3—3 of Fig. 2; and

Fig. 4 is a sectional view taken on line 4—4 of Fig. 2.

The bumper of the present invention is of the flexible bar type designed to be attached to the frame of an automobile for the purpose of protecting the automobile from damage. As shown in the drawings, the bumper comprises a supporting bar 5, adapted to be attached to the frame of an automobile, and spaced impact bars 6 and 7 secured to supporting bar 5 as by means of end brackets 8 and a center clamp 9.

The impact bars 6 and 7 are exactly alike, and are preferably formed from flat bars of spring steel stock having one surface rounded. The bars are formed by bending or curving the stock in one plane only, that is, in the plane which is perpendicular to the flat surface of the bar and which passes through the longitudinal axis thereof, thereby providing a central forwardly extending bend 10 with rearwardly inclined straight portions 11 extending transversely therefrom. As a convenient means for securing the impact bars 6 and 7 to the supporting bar 5, I show impact bars 6 and 7 formed with end bends 12 which are secured to end brackets 8, on supporting bar 5, as by means of rivets 13.

When assembled as shown, impact bars 6 and 7 are held in spaced relation by end brackets 8, with bar 6 tilted upwardly from the horizontal plane represented by line A—B, and bar 7 tilted downwardly from this horizontal plane. By thus tilting the impact bars the vertical spacing of the bars is made greater at their center than at their ends, thereby providing an impact surface which is wider centrally of the bumper than at its ends. Furthermore, with the impact bars thus held in vertically spaced tilted relation, the portions of the bars comprising the forwardly extending bends 10, appear as portions oppositely arched with respect to the horizontal plane when the bumper is viewed from the front, whereby these bars, which have actually been bent in one plane only, closely resemble impact bars which have been bent in two planes.

For manufacturing purposes it may be desirable to secure supporting bar 5 and impact bars 6 and 7 together centrally of the bumper. To accomplish this end, I have shown supporting bar 5 formed with a central forwardly extending bend 14 which supports the center clamp 9. This center clamp 9, as shown in Fig. 3, comprises a clamping member 15, having oppositely inclined end portions 16, and a plate 17, carrying a stud 18, which projects through clamping member 15 and supporting bar 5. When in assembled position, the flat surfaces of impact bars 6 and 7 bear against inclined end portions 16, while projections 19, formed integral with plate 17, extend between the bars. Stud 18 is provided with a nut 20 and lock-washer 21 by means of which clamping member 15 and plate 17 are drawn together so as to clamp the impact bars therebetween and thus assist end brackets 8 in holding these bars in tilted vertically spaced position.

It will now be readily apparent that when the bumper is viewed from the front, as shown in Fig. 1, the tilted impact bars appear to have central portions which are oppositely arched with respect to the horizontal plane, with oppositely inclined straight portions extending transversely from the arched portions, and that in appearance the bumper closely resembles a bumper having edge-bent impact bars.

While I have shown and described the preferred embodiment of my invention, it will be understood that various changes and alterations may be made therein without departing from the spirit of the invention or the scope of the appended claims.

Having thus described my invention, I claim:

1. A bumper comprising a supporting bar and a plurality of impact bars secured to said supporting bar, said supporting bar having a central bend extending forwardly into proximity with said impact bars, one of said impact bars having a central forwardly extending bend and being tilted upwardly from a horizontal plane whereby substantially the full length of said tilted bar has a vertically arched appearance when the bumper is viewed from the front.

2. A bumper comprising a supporting bar and a plurality of impact bars secured to said supporting bar, one of said impact bars having a central forwardly extending bend and being tilted upwardly from a horizontal plane whereby substantially the full length of said tilted bar has a vertically arched appearance when the bumper is viewed from the front, and means for securing said bars together at the center of the bumper.

3. A bumper comprising a supporting bar and a plurality of impact bars secured to said supporting bar, said supporting bar having a central bend extending forwardly into proximity with said impact bars, said impact bars each having a central forwardly extending bend, one of said impact bars being tilted upwardly and another tilted downwardly from a horizontal plane whereby the central portions of said tilted bars appear to be oppositely arched with respect to said plane when the bumper is viewed from the front.

4. A bumper comprising a supporting bar and a plurality of impact bars secured to said supporting bar, said impact bars each having a central forwardly extending bend, one of said impact bars being tilted upwardly and another tilted downwardly from a horizontal plane whereby the central portions of said tilted bars appear to be oppositely arched with respect to said plane when the bumper is viewed from the front, and means for securing said bars together at the center of the bumper.

5. A bumper comprising a supporting bar, a plurality of impact bars adjacent the opposite ends thereof each having a central forwardly extending bend, said impact bars being secured to said supporting bar and tilted from a horizontal plane thereby forming a wider impact surface centrally of the bumper than at its ends.

6. A bumper comprising a supporting bar, a plurality of impact bars each having a central forwardly extending bend, said impact bars being secured to said supporting bar and tilted from a horizontal plane thereby forming a wider impact surface centrally of the bumper than at its ends, and means for securing said bars together at the center of the bumper.

7. A bumper comprising a supporting bar and a plurality of impact bars secured to said supporting bar, said impact bars each having a central forwardly extending bend, one of said impact bars being tilted upwardly and another tilted downwardly from a horizontal plane whereby said tilted bars when viewed from the front appear to have central portions oppositely arched with respect to said plane and oppositely inclined straight portions extending transversely from said central portions.

8. A bumper comprising a supporting bar and a plurality of impact bars secured to said supporting bar, said impact bars each having a central forwardly extending bend, one of said impact bars being tilted upwardly and another tilted downwardly from a horizontal plane whereby said tilted bars when viewed from the front appear to have central portions oppositely arched with respect to said plane and oppositely inclined straight portions extending transversely from said central portions, and means for securing said bars together at the center of the bumper.

In testimony whereof, I hereunto affix my signature.

JAMES M. HOWE.